(12) United States Patent
Matsubara (10) Patent No.: US 11,618,285 B2
(45) Date of Patent: Apr. 4, 2023

(54) PNEUMATIC TIRE (71) Applicant: TOYO TIRE CORPORATION, Itami (JP)

(72) Inventor: Keisuke Matsubara, Itami (JP)

(73) Assignee: Toyo Tire Corporation, Itami (JP)

( * ) Notice: Subject to any disclaimer, the term of this patent is extended or adjusted under 35 U.S.C. 154(b) by 119 days.

(21) Appl. No.: 17/108,186

(22) Filed: Dec. 1, 2020

(65) Prior Publication Data
US 2021/0170805 A1 Jun. 10, 2021

(30) Foreign Application Priority Data

Dec. 6, 2019 (JP) .............................. JP2019-221430

(51) Int. Cl.
*B60C 13/02* (2006.01)
*B60C 11/01* (2006.01)

(52) U.S. Cl.
CPC .......... *B60C 13/02* (2013.01); *B60C 2200/14* (2013.01)

(58) Field of Classification Search
CPC ....... B60C 13/02; B60C 11/01; B60C 13/001; B60C 13/00
See application file for complete search history.

(56) References Cited

U.S. PATENT DOCUMENTS

| | | | |
|---|---|---|---|
| 2006/0032569 A1* | 2/2006 | Zimmer | G03F 7/0037 156/116 |
| 2013/0068362 A1* | 3/2013 | Kudo | B60C 13/001 152/450 |
| 2013/0139936 A1* | 6/2013 | Ohara | B60C 9/2006 152/209.11 |
| 2019/0077199 A1* | 3/2019 | Nishikawa | B60C 13/02 |
| 2019/0291516 A1* | 9/2019 | Nakajima | B60C 13/001 |

FOREIGN PATENT DOCUMENTS

| | | | |
|---|---|---|---|
| CH | 702363 A2 * | 6/2011 | B60B 11/04 |
| JP | 6446957 B2 | 1/2019 | |

OTHER PUBLICATIONS

CH 702363 Machine Translation, Jaroslav, Juhan (Year: 2011).*

* cited by examiner

*Primary Examiner* — Robert C Dye
*Assistant Examiner* — Nicholas J Weiler
(74) *Attorney, Agent, or Firm* — WHDA, LLP (57) ABSTRACT

A pneumatic tire includes a first land portion that is provided on a sidewall portion, projects to an outer side in a tire width direction, and extends in a tire circumferential direction over the entire tire circumferential direction, and a plurality of second land portions that are provided in a central portion in a tire radial direction of the first land portion, project to an outer side in the tire width direction, extend in the tire circumferential direction, and are disposed apart from each other in the tire circumferential direction.

12 Claims, 5 Drawing Sheets

PNEUMATIC TIRE

CROSS-REFERENCE TO RELATED APPLICATIONS

This application claims priority of Japanese Patent Application No. 2019-221430 filed on Dec. 6 2019, the content of which is incorporated herein by reference.

BACKGROUND OF THE INVENTION

Technical Field

The present invention relates to a pneumatic tire.

Related Art

A pneumatic tire that includes a protector that projects to the outer side in the tire width direction in a sidewall portion in order to improve the external damage resistance is known. For example, Japanese Patent No. 6446957 discloses a pneumatic tire that includes a protector projecting to the outer side in the tire width direction on a sidewall portion and has a plurality of grooves formed on the protector.

SUMMARY

The pneumatic tire disclosed in Japanese Patent No. 6446957 is intended to suppress damage to the protector by providing a plurality of grooves on the protector provided on the sidewall portion. However, traction performance is not taken into consideration.

An object of the present invention is to improve the external damage resistance of a sidewall portion and the traction performance of a pneumatic tire.

The present invention provides a pneumatic tire including a first land portion that is provided on a sidewall portion, projects to an outer side in a tire width direction, and extends in a tire circumferential direction over the entire tire circumferential direction, and a plurality of second land portions that are provided in a central portion in a tire radial direction of the first land portion, project to an outer side in the tire width direction, extend in the tire circumferential direction, and are disposed apart from each other in the tire circumferential direction.

By the present configuration, the first land portion is provided over the entire tire circumferential direction on the sidewall portion. Accordingly, the sidewall portion is reinforced by the first land portion, and it is possible to improve the external damage resistance of the sidewall portion. Since a plurality of the second land portions are provided away from each other in the tire circumferential direction in the central portion in the tire radial direction of the first land portion, it is possible to improve the external damage resistance of the sidewall portion by reinforcing the sidewall portion with the second land portion, and also to improve the traction performance by the second land portion. Therefore, the external damage resistance of the sidewall portion and the traction performance can be improved by the first land portion and the second land portion.

The first land portion is disposed in a range of 50% or less of the tire cross-sectional height from the outermost diameter end position of the tire tread surface to the inner side in the tire radial direction.

By the present configuration, the first land portion and the second land portion are disposed on the outer side in the tire radial direction of the sidewall portion, so that the external damage resistance of the sidewall portion and the traction performance can be improved by the first land portion and the second land portion.

The tire radial dimension of the first land portion is preferably 20% or more and 40% or less of the tire cross-sectional height.

By the present configuration, the tire radial dimension of the first land portion is appropriately set, so that the effect of improving the external damage resistance of the sidewall portion can be effectively obtained. In a case where the tire radial dimension of the first land portion is less than 20% of the tire cross-sectional height, the tire radial dimension of the first land portion is small, and it is difficult to obtain the effect of improving the external damage resistance of the sidewall portion by the first land portion. In a case where the tire radial dimension of the first land portion is larger than 40% of the tire cross-sectional height, the inner end portion in the tire radial direction of the first land portion is disposed near the maximum width position where the deformation of the sidewall portion becomes large. Accordingly, damage such as cracks is likely to occur in the inner end portion in the tire radial direction of the first land portion, and it is difficult to obtain the effect of improving the external damage resistance of the sidewall portion by the first land portion.

Further, a ratio of the tire radial dimension of each of the second land portions to the tire radial dimension of the first land portion is preferably 50% or more and 80% or less.

By the present configuration, the ratio of the tire radial dimension of each of the second land portions to the tire radial dimension of the first land portion is appropriately set, so that the effect of improving the external damage resistance of the sidewall portion and the traction performance by the second land portion can be effectively obtained. In a case where the ratio is less than 50%, the tire radial dimension of the second land portion is small, and it is difficult to obtain the effect of improving the external damage resistance of the sidewall portion by the second land portion. In a case where the ratio is larger than 80%, both end portions in the tire radial direction of the second land portion are disposed near both end portions in the tire radial direction of the first land portion, and it is difficult to obtain the effect of improving the traction performance by the second land portion.

The ratio of the projection height of each of the second land portions to the projection height of the first land portion is preferably 100% or more and 400% or less.

By the present configuration, the ratio of the projection height of each of the second land portions to the projection height of the first land portion is appropriately set, so that the effect of improving the external damage resistance of the sidewall portion and the traction performance by the second land portion can be effectively obtained. In a case where the ratio is less than 100%, the projection height of the second land portion is small, and it is difficult to obtain the effect of improving the external damage resistance of the sidewall portion and the traction performance by the second land portion. In a case where the ratio is larger than 400%, the projection height of the second land portion is large, and damage such as cracks is likely to occur in both end portions in the tire radial direction of the second land portion. Accordingly, it is difficult to obtain the effect of improving the external damage resistance of the sidewall portion by the second land portion.

A connecting portion that protrudes to the outer side in the tire width direction from the first land portion and extends in the tire circumferential direction to connect two of the second land portions adjacent to each other in the tire circumferential direction is preferably included.

By the present configuration, two of the second land portions adjacent to each other in the tire circumferential direction are connected by the connecting portion, so that the second land portion is reinforced and generation of damage such as cracks in the peripheral portion of the second land portion can be suppressed.

According to the pneumatic tire of the present invention, the external damage resistance of the sidewall portion and the traction performance can be improved.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment of the present invention will be described with reference to the accompanying drawings.

Figure 1:
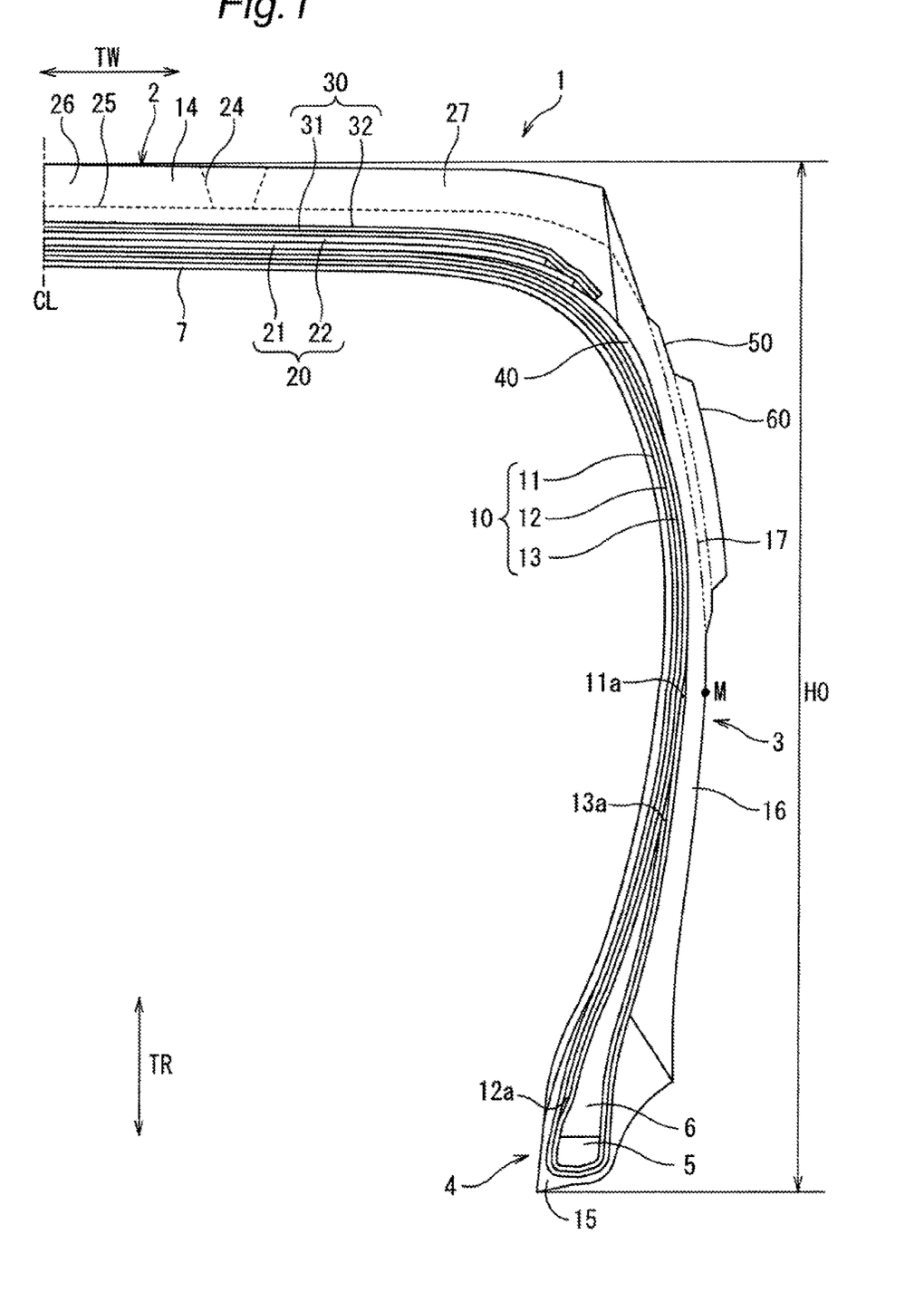
FIG. 1 is a meridian half cross-sectional view of a pneumatic tire according to an embodiment of the present invention.
Figure 2:
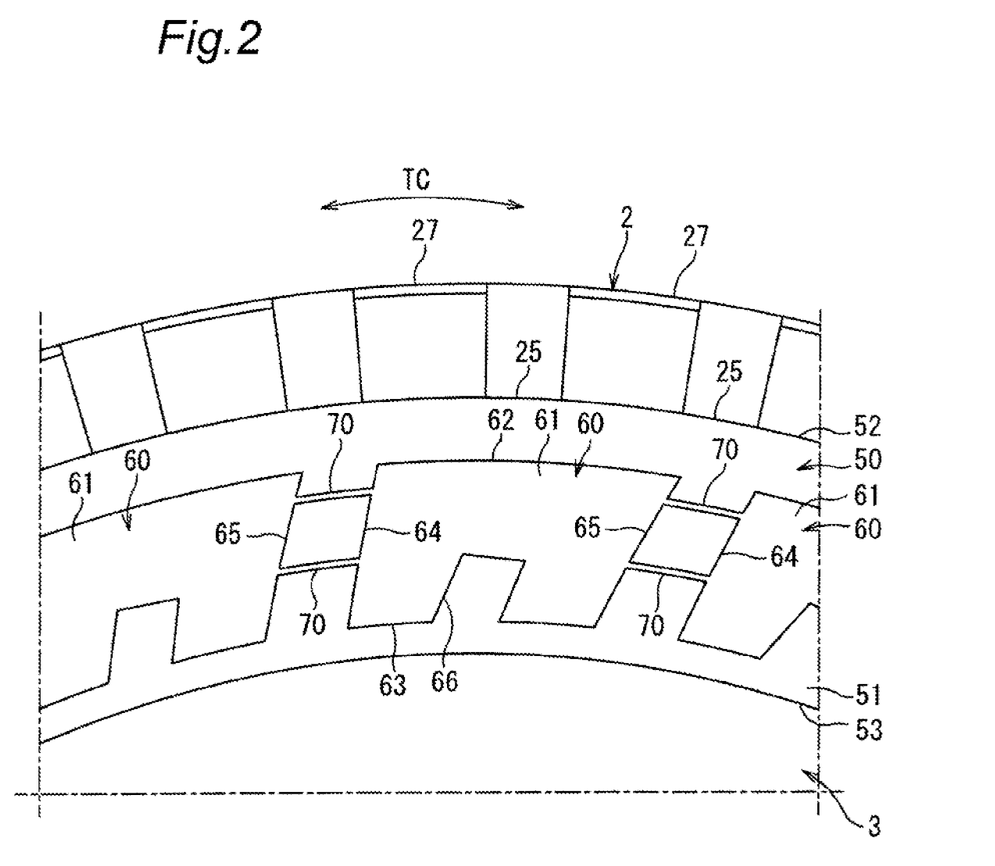
FIG. 2 is a side view showing part of the pneumatic tire.
Figure 3:
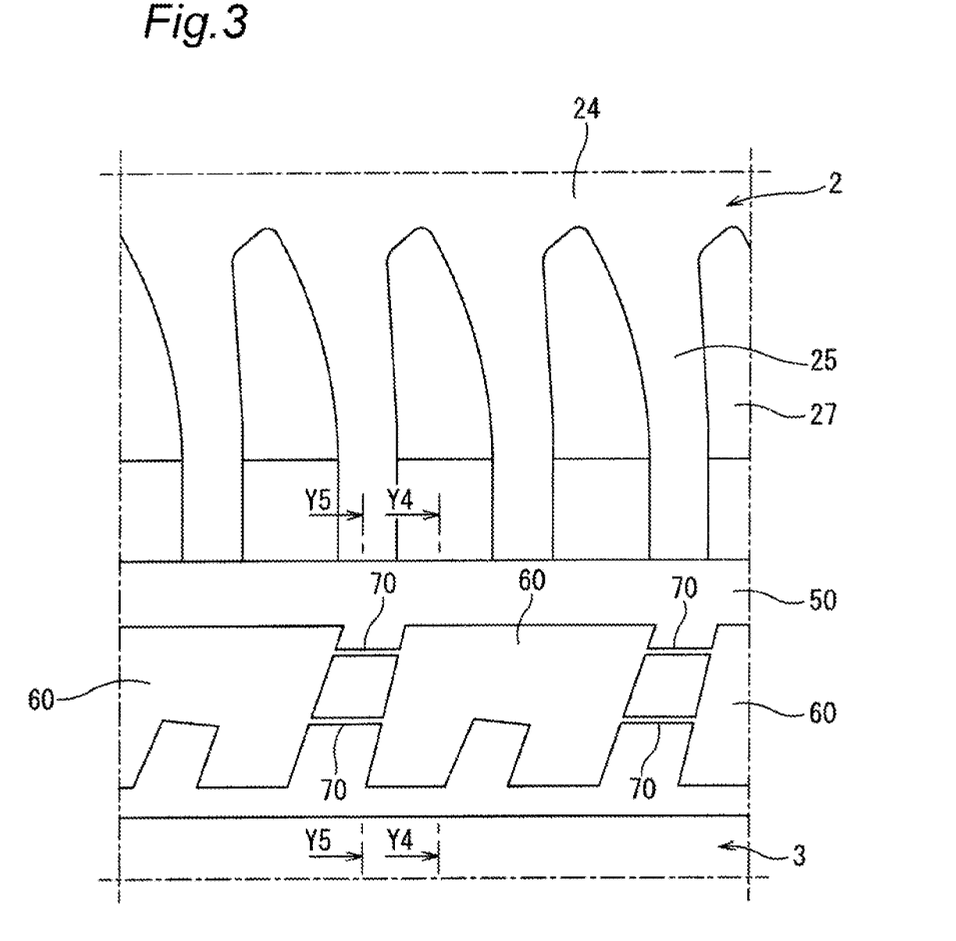
FIG. 3 is a development view of main parts of a tread portion and a sidewall portion of the pneumatic tire.

FIG. 1 is a meridian half cross-sectional view of a pneumatic tire according to the embodiment of the present invention, FIG. 2 is a side view showing part of the pneumatic tire, and FIG. 3 is a development view of main parts of a tread portion and a sidewall portion of the pneumatic tire. A pneumatic tire (hereinafter, also referred to as "tire") 1 according to the embodiment of the present invention is an off-road tire mounted on a vehicle such as an SUV for traveling on a rough road such as an unpaved road.

As shown in FIGS. 1 to 3, the pneumatic tire 1 includes a tread portion 2 having a tire tread surface in contact with the road surface, sidewall portions 3 on both sides that extend from the outer side in the tire width direction of the tread portion 2 to the inner side in the tire radial direction and constitute the side surface of the pneumatic tire 1, and bead portions 4 on both sides that are located on the inner side in the tire radial direction of the sidewall portions 3 on both sides and are fixed to the rim of a wheel (not shown).

The bead portion 4 has a bead core 5 and a bead filler 6 disposed on the outer side in the tire radial direction of the bead core 5. The bead core 5 is formed in an annular shape by bundling a plurality of bead wires. The bead filler 6 reinforces the bead core 5, and is formed of a rubber material in an annular shape having a substantially triangular cross section.

The tire 1 includes a carcass ply 10 stretching in a toroidal shape between the bead portions 4 on both sides, specifically between the bead cores 5 on both sides. The carcass ply 10 is composed of first, second, and third carcass plies 11, 12, and 13. The first, second, and third carcass plies 11, 12, and 13 are formed in a strip shape by arranging a plurality of wires side by side and covering them with rubber.

The first carcass ply 11 is stretched between the bead cores 5 on both sides, and an outer end portion 11a of the first carcass ply 11 is wound up with respect to the bead core 5 and is located near a maximum width position M of the sidewall portion 3 on the outer side in the tire radial direction than the bead filler 6. The second carcass ply 12 is disposed so as to overlap the outer side in the tire radial direction of the first carcass ply 11, and an outer end portion 12a of the second carcass ply 12 is not wound up with respect to the bead core 5 and is located on the outer side in the tire radial direction than the bead core 5. The third carcass ply 13 is disposed so as to overlap the outer side in the tire radial direction of the second carcass ply 12, and an outer end portion 13a of the third carcass ply 13 is wound up with respect to the bead core 5 and is located near the outer side in the tire radial direction of the bead filler 6.

On the inner side in the tire radial direction of the carcass ply 10, an inner liner 7 for holding air pressure constituting the tire inner surface is disposed. The inner liner 7 is provided over the tread portion 2, the sidewall portions 3 on both sides, and the bead portions 4 on both sides, and is made from a rubber material that prevents air from permeating.

An endless belt ply 20 is disposed on the outer side in the tire radial direction of the carcass ply 10 in the tread portion 2. The belt ply 20 is composed of first and second belt plies 21 and 22. The first belt ply 21 is disposed so as to overlap the outer side in the tire radial direction of the carcass ply 10, and the second belt ply 22 is disposed so as to overlap the outer side in the tire radial direction of the first belt ply 21.

The outer side in the tire width direction of the second belt ply 22 is provided on the inner side in the tire width direction (the tire equator line CL side) than the outer side in the tire width direction of the first belt ply 21. The first and second belt plies 21 and 22 are formed in a strip shape by arranging a plurality of wires side by side and covering them with rubber.

An endless cap ply 30 is disposed on the outer side in the tire radial direction of the belt ply 20. The cap ply 30 is for reinforcing the belt ply 20 and covers the belt ply 20. The cap ply 30 is composed of first and second cap plies 31, 32. The first cap ply 31 is disposed so as to overlap the outer side in the tire radial direction of the belt ply 20, and the second cap ply 32 is disposed so as to overlap the outer side in the tire radial direction of the first cap ply 31. The first and second cap plies 31 and 32 are formed in a strip shape by arranging a plurality of wires side by side and covering them with rubber.

An endless pad 40 made from rubber is disposed between the outer end portion in the tire width direction of the belt ply 20 and the carcass ply 10. The outer end portions in the tire width direction of the first and second belt plies 21 and 22 and the outer end portions in the tire radial direction of the first and second cap plies 31 and 32 are located at positions overlapping the pad 40 in the tire width direction.

The tire 1 includes tread rubber 14 that is provided on the outer side in the tire radial direction of the cap ply 30 in the tread portion 2 and forms the outer surface of the tread portion 2, rim strip rubber 15 that is provided on the inner side in the tire radial direction and both sides in the tire width direction of the carcass ply 10 in the bead portion 4 and forms the outer surface of the bead portion 4, and sidewall rubber 16 that is provided on the outer side in the tire width direction of the carcass ply 10 in the sidewall portion 3 and forms the outer surface of the sidewall portion 3.

The tread portion 2 is provided with a plurality of blocks 26 and 27 defined by a main groove 24 extending in a tire circumferential direction TC and a plurality of lateral grooves 25 extending in a tire width direction TW. The tread portion 2 is provided with the center block 26 disposed on the central side in the tire width direction and the shoulder block 27 disposed on the outer side in the tire width direction. The shoulder block 27 is disposed on the outer side in the tire width direction of the tread portion 2 and extends in the tire width direction TW. A plurality of the shoulder blocks 27 are provided at equal intervals along the tire circumferential direction TC in the tread portion 2.

The sidewall portion 3 is provided with a first land portion 50 projecting to the outer side in the tire width direction and extending in the tire circumferential direction TC, and a plurality of second land portions 60 projecting to the outer side in the tire width direction from the first land portion 50 and extending in the tire circumferential direction TC. The first land portion 50 is disposed on the outer side in the tire radial direction of the sidewall portion 3, and is continuously provided in an annular shape in the entire tire circumferential direction. A plurality of the second land portions 60 are dispersedly disposed in the entire tire circumferential direction so as to be separated in the tire circumferential direction TC.

Figure 4:
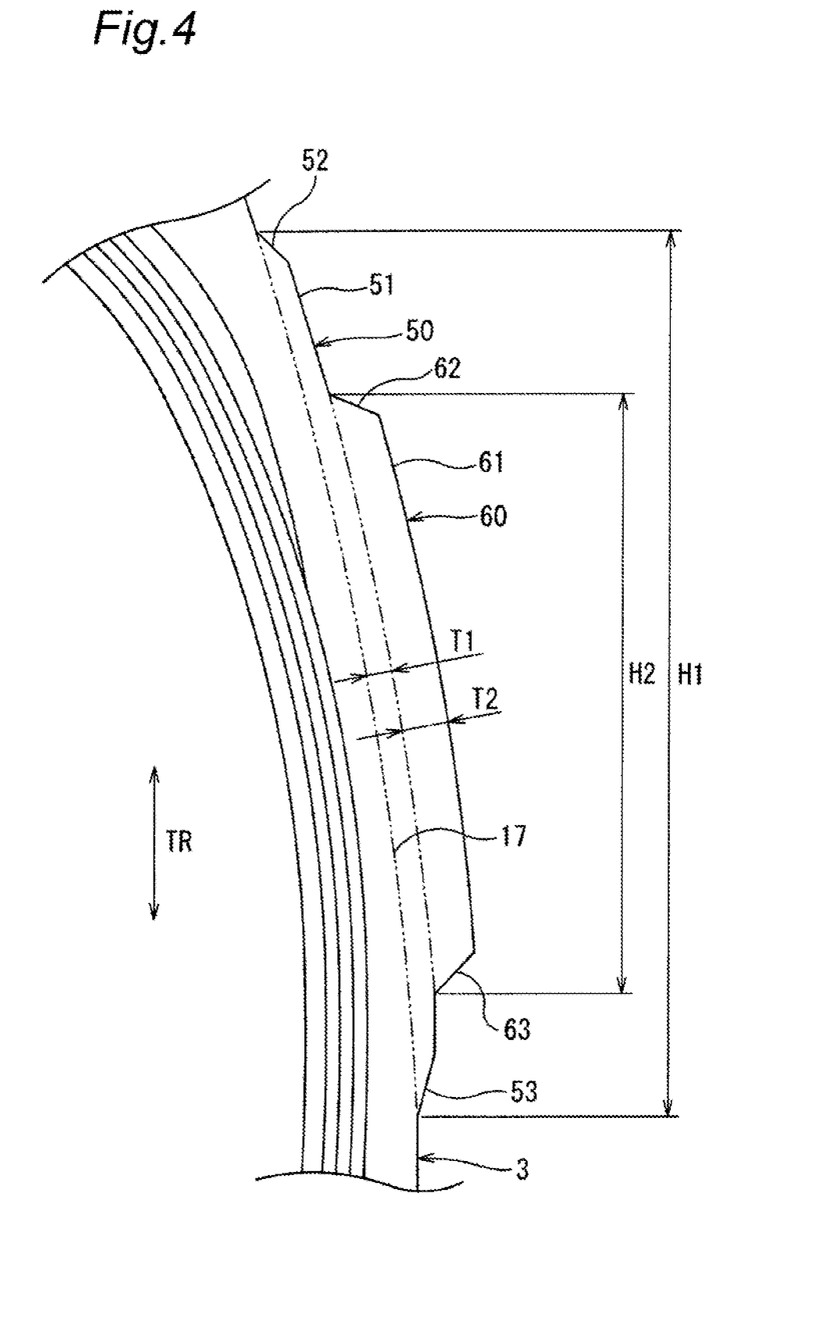
FIG. 4 is a cross-sectional view of the sidewall portion along line Y4-Y4 of FIG. 3.
Figure 5:
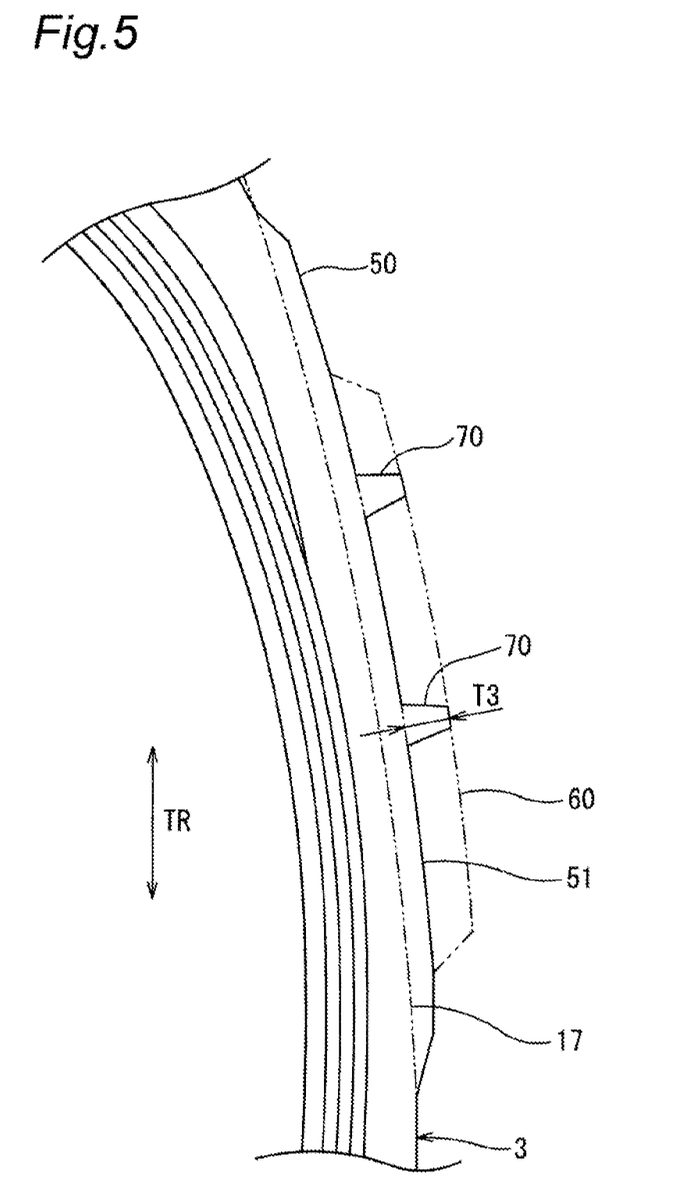
FIG. 5 is a cross-sectional view of the sidewall portion along line Y5-Y5 of FIG. 3.

FIG. 4 is a cross-sectional view of the sidewall portion along line Y4-Y4 of FIG. 3, and FIG. 5 is a cross-sectional view of the sidewall portion along line Y5-Y5 of FIG. 3. As shown in FIG. 4, the first land portion 50 projects to the outer side in the tire width direction from a profile surface (reference surface) 17 on the outer side in the tire width direction of the sidewall portion 3, and has a predetermined projection height T1 of, for example, 2 mm.

The first land portion 50 includes an upper surface portion 51 projecting to the outer side in the tire width direction, a first side surface portion 52 extending from the outer end portion in the tire radial direction of the upper surface portion 51 to the inner side in the tire width direction, and a second side surface portion 53 extending from the inner end portion in the tire radial direction of the upper surface portion 51 to the inner side in the tire width direction, and is formed in a substantially trapezoidal shape in the tire meridian cross section.

A plurality of the second land portions 60 are formed in the same shape and are disposed in the central portion in the tire radial direction of the first land portion 50. The second land portion 60 projects to the outer side in the tire width direction from the first land portion 50, and has a predetermined projection height T2 of, for example, 4 mm.

The second land portion 60 includes an upper surface portion 61 projecting to the outer side in the tire width direction, a first side surface portion 62 extending from the outer end portion in the tire radial direction of the upper surface portion 61 to the inner side in the tire width direction, a second side surface portion 63 extending from the inner end portion in the tire radial direction of the upper surface portion 61 to the inner side in the tire width direction, a third side surface portion 64 extending from one side end portion in the tire circumferential direction of the upper surface portion 61 to the inner side in the tire width direction, and a fourth side surface portion 65 extending from the other side end portion in the tire circumferential direction of the upper surface portion 61 to the inner side in the tire width direction, and is formed in a substantially trapezoidal shape in the tire meridian cross section.

As shown in FIG. 2, each of the first side surface portion 62 and the second side surface portion 63 of the second land portion 60 extends in a substantially arc shape along the tire circumferential direction TC, each of the third side surface portion 64 and the fourth side surface portion 65 of the second land portion 60 extends in a manner inclined with respect to a tire radial direction TR, and the upper surface portion 61 of the second land portion 60 is formed in a substantially rectangular shape in the side view.

In the second side surface portion 63 of the second land portion 60, a recess 66 that is recessed in a substantially rectangular shape to the outer side in the tire radial direction is formed on the central side in the tire circumferential direction. The second land portion 60 is formed so that the dimension in tire radial direction of the central side portion in the tire circumferential direction is smaller than that of both side portions in the tire circumferential direction. The both side portions in the tire circumferential direction of the second land portion 60 are provided facing the shoulder block 27 in the tire width direction TW.

As shown in FIGS. 2 and 3, the sidewall portion 3 is provided with at least one connecting portion 70 that connects two of the second land portions 60 adjacent to each other in the tire circumferential direction TC. The connecting portion 70 projects to the outer side in the tire width direction from the first land portion 50, and has a predetermined projection height T3 of, for example, 4 mm.

As shown in FIG. 5, the connecting portion 70 is formed in a substantially trapezoidal shape in the tire meridian cross section. The connecting portion 70 is formed in a substantially arc shape along the tire circumferential direction TC, and extends in the tire circumferential direction TC between the third side surface portion 64 and the fourth side surface portion 65, which face each other, of two of the second land portions 60 adjacent to each other in the tire circumferential direction TC.

In the tire 1, two of the connecting portions 70 connecting two of the second land portions 60 adjacent to each other in the tire circumferential direction TC are provided, and the two connecting portions 70 are disposed apart from each other in the tire radial direction TR. One of the two connecting portions 70 connects the outer sides in the tire radial direction of two of the second land portions 60 adjacent to each other in the tire circumferential direction TC, and the other one of the two connecting portions 70 connects the central sides in the tire radial direction of two of the second land portions 60 adjacent to each other in the tire circumferential direction TC.

As shown in FIGS. 1 and 4, the first land portion 50 provided in the sidewall portion 3 is disposed in a range of 50% or less of a tire cross-sectional height H0 from the outermost diameter end position of the tire tread surface to the inner side in the tire radial direction. The first land portion 50 is also set so that a tire radial dimension H1 is 20% or more and 40% or less of the tire cross-sectional height H0. When the tire radial dimension H1 of the first land portion 50 is less than 20% or greater than 40% of the tire cross-sectional height H0, it is difficult to obtain the effect of improving the external damage resistance of the sidewall portion 3 by the first land portion 50.

The second land portion 60 is provided on the central side in the tire radial direction of the first land portion 50. The second land portion 60 is preferably set so that a ratio (H2/H1) of the tire radial dimension H2 of each of the second land portions 60 to the tire radial dimension H1 of the first land portion 50 is 50% or more and 80% or less. When the ratio (H2/H1) is less than 50%, it is difficult to obtain the effect of improving the external damage resistance of the sidewall portion 3 by the second land portion 60. When the ratio (H2/H1) is larger than 80%, it is difficult to obtain the effect of improving the traction performance by the second land portion 60.

The second land portion 60 is preferably disposed so that the outer end portion in the tire radial direction and the inner end portion in the tire radial direction are respectively away from the outer end portion in the tire radial direction and the inner end portion in the tire radial direction of the first land portion 50 by 10% or more of the tire cross-sectional height H0 in the tire radial direction TR. In this manner, the effect of improving the external damage resistance and the traction performance by the second land portion 60 can be effectively obtained.

The first land portion 50 and the second land portion 60 are preferably formed, so that a ratio (T2/T1) of a projection height T2 of each of the second land portions 60 to a projection height T1 of the first land portion 50 is 100% or more and 400 or less. In a case where the ratio (T2/T1) is less than 100%, it is difficult to obtain the effect of improving the external damage resistance of the sidewall portion 3 and the traction performance by the second land portion 60. When the ratio (T2/T1) is larger than 400%, it is difficult to obtain the effect of improving the external damage resistance of the sidewall portion 3 by the second land portion 60.

In the tire 1, the connecting portion 70 is preferably formed so as to have a projection height H3 which is the same as the projection height T2 of the second land portion 60. The connecting portion 70 can also be formed so as to have the projection height T3 which is smaller than the projection height T2 of the second land portion 60.

Each dimension related to the tire 1 is the dimension measured in a state under no load in which the tire 1 is mounted on a standard rim and filled with normal internal pressure. The standard rim is a rim that is defined for each tire in the standard system including the standard on which the tire is based. For example, "standard rim" is used in JATMA, "Design Rim" is used in TRA, and "Measuring Rim" is used in ETRTO.

In the tire 1, the first land portion 50, the second land portion 60, and the connecting portion 70 provided on the sidewall portion 3, which are provided on at least one of the sidewall portions 3 on both sides, are preferably provided on the sidewall portions 3 on both sides.

In the tire 1, the second land portion 60 and the connecting portion 70 are provided on the first land portion 50. However, it is also possible to provide a reinforcing portion that projects to the outer side in the tire width direction from the first land portion 50 and extends in the tire radial direction, and connects both side portions in the tire circumferential direction of the second land portion 60 and the facing shoulder block 27.

As described above, the pneumatic tire 1 according to the present embodiment includes the first land portion 50 that is provided on the sidewall portion 3, projects to the outer side in the tire width direction, and extends in the tire circumferential direction TC over the entire tire circumferential direction, and a plurality of the second land portions 60 that are provided in the central portion in the tire radial direction of the first land portion 50, project to the outer side in the tire width direction, extend in the tire circumferential direction TC, and are disposed apart from each other in the tire circumferential direction TC.

In this manner, the first land portion 50 is provided over the entire tire circumferential direction on the sidewall portion 3. Accordingly, the sidewall portion 3 is reinforced by the first land portion 50, and it is possible to improve the external damage resistance of the sidewall portion 3. Since a plurality of the second land portions 60 are provided away from each other in the tire circumferential direction TC in the central portion in the tire radial direction of the first land portion 50, it is possible to improve the external damage resistance of the sidewall portion 3 by reinforcing the sidewall portion 3 with the second land portion 60, and also to improve the traction performance by the second land portion 60. Therefore, the external damage resistance of the sidewall portion 3 and the traction performance can be improved by the first land portion 50 and the second land portion 60.

Further, the first land portion 50 is disposed in a range of 50% or less of the tire cross-sectional height H0 from the outermost diameter end position of the tire tread surface to the inner side in the tire radial direction. In this manner, the first land portion 50 and the second land portion 60 are disposed on the outer side in the tire radial direction of the sidewall portion 3, so that the external damage resistance of the sidewall portion 3 and the traction performance can be improved by the first land portion 50 and the second land portion 60.

Further, the tire radial dimension H1 of the first land portion 50 is 20% or more and 40% or less of the tire cross-sectional height H0. In this manner, the tire radial dimension H1 of the first land portion 50 is appropriately set, so that the effect of improving the external damage resistance of the sidewall portion 3 can be effectively obtained. In a case where the tire radial dimension H1 of the first land portion 50 is less than 20% of the tire cross-sectional height H0, the tire radial dimension H1 of the first land portion 50 is small, and it is difficult to obtain the effect of improving the external damage resistance of the sidewall portion 3 by the first land portion 50. In a case where the tire radial dimension H1 of the first land portion 50 is larger than 40% of the tire cross-sectional height H0, the inner end portion in the tire radial direction of the first land portion 50 is disposed near the maximum width position M where the deformation of the sidewall portion 3 becomes large. Accordingly, damage such as cracks is likely to occur in the inner end portion in the tire radial direction of the first land portion 50, and it is difficult to obtain the effect of improving the external damage resistance of the sidewall portion 3 by the first land portion 50.

Further, the ratio (H2/H1) of the tire radial dimension H2 of each of the second land portions 60 to the tire radial dimension H1 of the first land portion 50 is 50% or more and 80% or less. In this manner, the ratio (H2/H1) of the tire radial dimension H2 of each of the second land portions 60 to the tire radial dimension H1 of the first land portion 50 is appropriately set, so that the effect of improving the external damage resistance of the sidewall portion 3 and the effect of improving the traction performance by the second land portion 60 can be effectively obtained. In a case where the ratio (H2/H1) is less than 50%, the tire radial dimension H2 of the second land portion 60 is small, and it is difficult to obtain the effect of improving the external damage resistance of the sidewall portion 3 by the second land portion 60. In a case where the ratio (H2/H1) is larger than 80%, both end portions in the tire radial direction of the second land portion 60 are disposed near both end portions in the tire radial direction of the first land portion 50, and it is difficult to obtain the effect of improving the traction performance by the second land portion 60.

Further, the ratio (T2/T1) of the projection height T2 of each of the second land portions 60 to the projection height T1 of the first land portion 50 is 100% or more and 400% or less. In this manner, the ratio (T2/T1) of the projection height T2 of each of the second land portions 60 to the projection height T1 of the first land portion 50 is appropriately set, so that the effect of improving the external damage resistance of the sidewall portion 3 and the traction performance by the second land portion 60 can be effectively obtained. In a case where the ratio (T2/T1) is less than 100%, the projection height T2 of the second land portion 60 is small, and it is difficult to obtain the effect of improving the external damage resistance of the sidewall portion 3 and the traction performance by the second land portion 60. In a case where the ratio (T2/T1) is larger than 400%, the projection height T2 of the second land portion 60 is large, and damage such as cracks is likely to occur in both end portions in the tire radial direction of the second land portion 60. Accordingly, it is difficult to obtain the effect of improving the external damage resistance of the sidewall portion 3 by the second land portion 60.

Further, the connecting portion 70 which projects to the outer side in the tire width direction from the first land portion 50 and extends in the tire circumferential direction TC to connect two of the second land portions 60 adjacent to each other in the tire circumferential direction TC is included. In this manner, two of the second land portions 60 adjacent to each other in the tire circumferential direction TC are connected by the connecting portion 70, so that the second land portion 60 is reinforced and generation of damage such as cracks in the peripheral portion of the second land portion 60 can be suppressed.

The present invention is not limited to the illustrated embodiment, and various improvements and design changes can be made without departing from the gist of the present invention.

What is claimed is:

1. A pneumatic tire comprising:
 a first land portion that is provided on a sidewall portion, projects to an outer side in a tire width direction, and extends in a tire circumferential direction over the entire tire circumferential direction;
 a plurality of second land portions that are provided in a central portion in a tire radial direction of the first land portion, project to an outer side in the tire width direction, extend in the tire circumferential direction, are dispersedly disposed in the entire circumferential direction so as to be separated in the tire circumferential direction, and are formed in the same shape; and
 a connecting portion that protrudes to an outer side in the tire width direction from the first land portion and extends in the tire circumferential direction to connect two of the second land portions adjacent to each other in the tire circumferential direction,
 wherein the central portion is defined by an outer end portion of each of the second land portions in the tire radial direction and an inner end portion of each of the second land portions in the tire radial direction being respectively away from an outer end portion and an inner end portion of the first land portion in the tire radial direction.

2. The pneumatic tire according to claim 1, wherein the first land portion is disposed in a range of 50% or less of a tire cross-sectional height from an outermost diameter end position of a tire tread surface to an inner side in the tire radial direction.

3. The pneumatic tire according to claim 2, wherein a tire radial dimension of the first land portion is 20% or more and 40% or less of the tire cross-sectional height.

4. The pneumatic tire according to claim 2, wherein a ratio of a tire radial dimension of each of the second land portions to the tire radial dimension of the first land portion is 50% or more and 80% or less.

5. The pneumatic tire according to claim 2, wherein a ratio of a projection height of each of the second land portions to a projection height of the first land portion is 100% or more and 400% or less.

6. The pneumatic tire according to claim 1, wherein a tire radial dimension of the first land portion is 20% or more and 40% or less of the tire cross-sectional height.

7. The pneumatic tire according to claim 6, wherein a ratio of a tire radial dimension of each of the second land portions to the tire radial dimension of the first land portion is 50% or more and 80% or less.

8. The pneumatic tire according to claim 6, wherein a ratio of a projection height of each of the second land portions to a projection height of the first land portion is 100% or more and 400% or less.

9. The pneumatic tire according to claim 1, wherein a ratio of a tire radial dimension of each of the second land portions to the tire radial dimension of the first land portion is 50% or more and 80% or less.

10. The pneumatic tire according to claim 9, wherein a ratio of a projection height of each of the second land portions to a projection height of the first land portion is 100% or more and 400% or less.

11. The pneumatic tire according to claim 1, wherein a ratio of a projection height of each of the second land portions to a projection height of the first land portion is 100% or more and 400% or less.

12. The pneumatic tire according to claim 1 wherein the connecting portion has a projection height which is the same as the projection height of the second land portion.

* * * * *